United States Patent
Young et al.

(10) Patent No.: US 6,390,395 B1
(45) Date of Patent: May 21, 2002

(54) HEAVY LIQUIDS FOR USE IN SEPARATION PROCESSES

(75) Inventors: Tom L. Young; Kathy Bauer; Michael G. Greene; Sharon K. Young, all of Tucson, AZ (US)

(73) Assignee: Versitech, Inc., Tucson, AZ (US)

( * ) Notice: Subject to any disclaimer, the term of this patent is extended or adjusted under 35 U.S.C. 154(b) by 0 days.

(21) Appl. No.: 09/465,864

(22) Filed: Dec. 16, 1999

Related U.S. Application Data

(60) Provisional application No. 60/112,550, filed on Dec. 16, 1998.

(51) Int. Cl.⁷ ............................................. B02C 23/20
(52) U.S. Cl. ........................... 241/20; 241/21; 204/162; 204/163
(58) Field of Search ................... 241/20, 21; 204/162, 204/163

(56) References Cited

U.S. PATENT DOCUMENTS

| | | |
|---|---|---|
| 3,966,569 A | * 6/1976 | Reinhardt et al. .......... 204/108 |
| 4,529,506 A | 7/1985 | Smit |
| 4,557,718 A | 12/1985 | Kamps et al. |
| 5,277,368 A | 1/1994 | Kindig |
| 5,328,035 A | 7/1994 | Duyvesteyn et al. |
| 5,593,650 A | 1/1997 | Prinz et al. |

FOREIGN PATENT DOCUMENTS

| | | |
|---|---|---|
| EP | 0572113 | 12/1993 |
| WO | 9631435 | 10/1996 |

* cited by examiner

*Primary Examiner*—Allen Ostrager
*Assistant Examiner*—William Hong
(74) *Attorney, Agent, or Firm*—Saliwanchik, Lloyd & Saliwanchik

(57) ABSTRACT

The subject invention pertains to the use of non-toxic heavy liquids and slurries in the separation of components of ores, concentrates, residues, soils, and scrap. Specifically exemplified herein is the use of cesium and/or rubidium salts in separation processes. These salts are particularly advantageous because of their high specific gravity and solubility in water and, their low solution viscosities.

12 Claims, 1 Drawing Sheet

HEAVY LIQUIDS FOR USE IN SEPARATION PROCESSES

CROSS-REFERENCE TO RELATED APPLICATIONS

This application claims priority from provisional application U.S. Serial No. 60/112,550, filed Dec. 16, 1998.

BACKGROUND OF THE INVENTION

Heavy liquids are used in laboratory and plant operations to achieve separations of minerals and other components of ores, concentrates, residues, and soils. These liquids may also be employed in the separation of various types of scrap including, but not limited to, metals, plastics, rubbers, and woods. Currently, liquids such as those listed in Table 1, below, are used to effect separations.

TABLE 1

Currently Used Heavy Media Liquids

| Liquid | Formula | Specific Gravity | Toxicity |
| --- | --- | --- | --- |
| Carbon Disulfide | $CS_2$ | 1.2693 | High |
| Carbon Tetrachloride | $CCl_4$ | 1.632 | High |
| Carbon Tetrabromide | $CBr_4$ | 2.961 | High |
| Methylene Iodide | $CH_2I_2$ | 3.321 | High |
| Thallous Salts | — | 5.0 | Extreme |

The severe toxicity of these chemicals limits their use. Therefore, there is a need for the identification of new materials and methods useful in separation procedures.

BRIEF SUMMARY OF THE INVENTION

The subject invention pertains to the use of non-toxic heavy liquids and slurries in the separation of components of ores, concentrates, residues, soils, and scrap. Specifically exemplified herein is the use of cesium and/or rubidium salts in separation processes. These salts are particularly advantageous because of their high specific gravity and solubility in water and, their low solution viscosities.

DETAILED DISCLOSURE OF THE INVENTION

Figure 1:
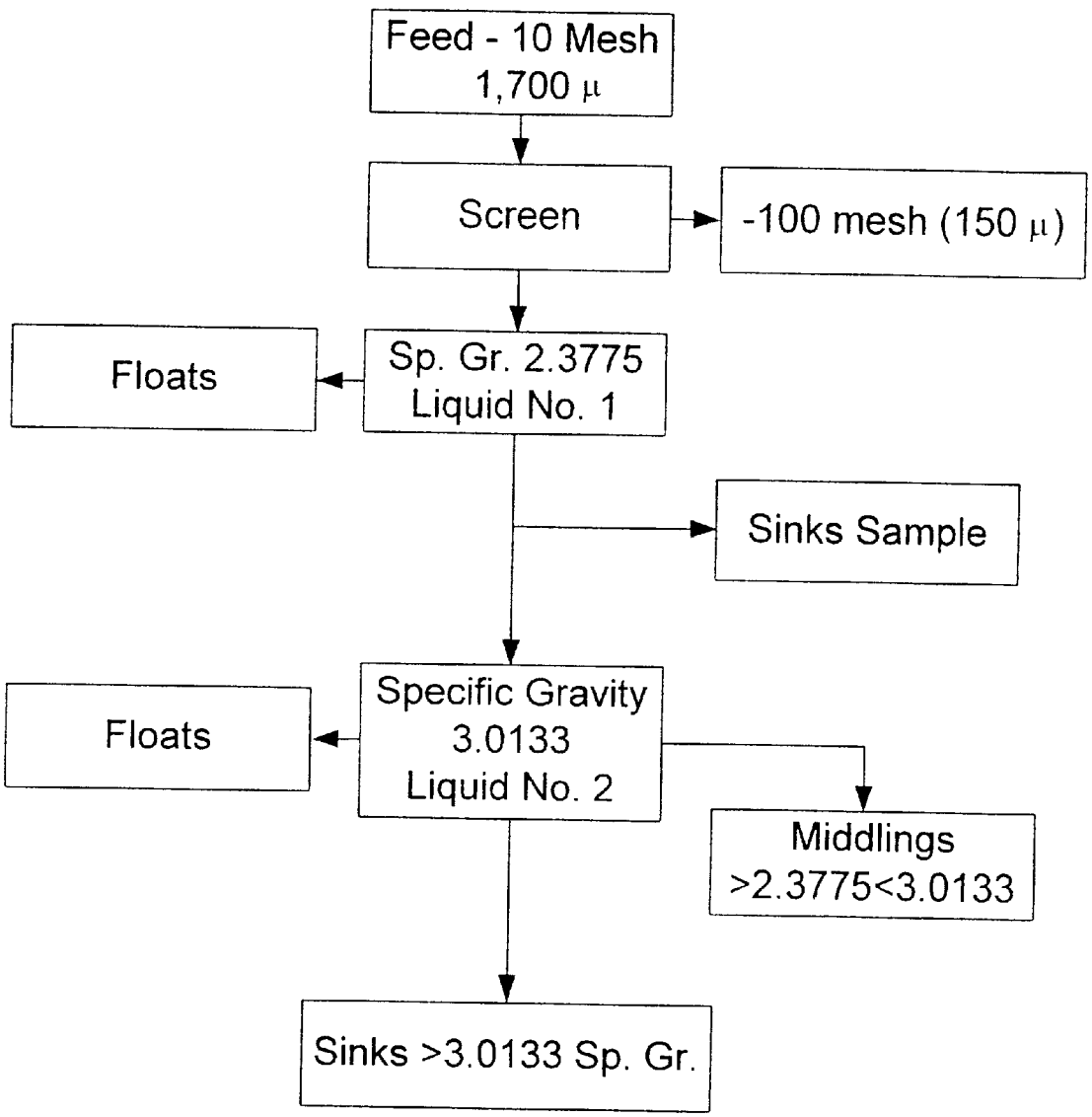
FIG. 1 shows a schematic representation of a separation scheme of the subject invention.

In accordance with the subject invention, it has been determined that salts of cesium and/or rubidium in aqueous solutions are highly advantageous for the separation of particles based on specific gravities. Cesium salts have been found to be particularly well-suited for separation because cesium is the heaviest of the naturally occurring alkali metals. Advantageously, salts of cesium are typically very soluble; therefore, high concentrations in aqueous solutions can be achieved. Cesium chloride, for example, is soluble to 65.6 mass percent of water solution at 25° C. Whereas the mass percent solubility in water at 25° C. of potassium chloride is 26.22, sodium chloride is 26.45, and rubidium chloride is 48.42.

All of the alkali metal (Group I) cations form readily soluble salts with anionic species. Lithium salts are generally the least soluble, cesium the most soluble. Only a few very large anionic species such as zinc-uranyl acetates $[Zn(UO_2)_3(CH_3COO)_9]^-$ form insoluble species.

A common technique is to enhance a separation process is the application of multiples of earth gravities by the use of some form of centrifugation technique. This additional force increases the settling velocities as seen in the formula for settling velocity shown below. Note that, while the viscosity of the solution does not appear in the equation, a large viscosity can hinder particle settling.

$$v = \sqrt{\frac{4}{3Q} \frac{p - p''}{p''} da}$$

where v=maximum settling velocity

Q=is the coefficient of resistance for particle 0.4 for spheres, around 2 to 3 for "blocky" particles p=density of the particle to be separated p''=density of solution or apparent density of suspension d=is the particle diameter a=acceleration due to gravity or centrifugal acceleration on particle Concentrated aqueous solutions of cesium salts have relatively high densities or specific gravities. For example, an 83.1% solution of cesium formate in water solution has a specific gravity of 2.3775, and an 85.6 gram solution of cesium tungstate in 100 grams of water has a specific gravity of 3.0133. These solutions have viscosities and surface tensions similar to water. Therefore, particles can separate almost entirely due to their specific gravity, not their size. With organic heavy media liquids, small particles tend to float due to the viscosity and surface tension of the liquid. The cesium solutions' lower viscosity and surface tension allows even small particles to be separated by their specific gravity.

Other alkali metal salts used as heavy media agents have clear disadvantages over the cesium salts of organic acids and inorganic acids. Cesium tungstate is a salt of cesium and tungstate with a formula of $Cs_5WO_4$. Sodium polytungstate (also called metatungstate $3Na_2WO_4*9WO_3*H_2O$; U.S. Pat. No. 4,557,718) is a commercially available heavy media material that can be used to make heavy media solutions in the 1.0 to 3.1 specific gravity range. The viscosities of its solutions increase exponentially over a specific gravity of 1.9. The viscosity of cesium tungstate and formate increase only slowly with increasing specific gravity, remaining near that of water at a specific gravity of around 3.0.

A solution of lithium metatungstate $(Li_6(H_2W_{12}O_{40})*3H_2O)$ is reported in U.S. Pat. No. 5,328,035 as having a maximum specific gravity of 3.5. The lithium metatungstate solutions in this patent are acidic in nature with a pH of around 4 to 4.5 according to the patent. Cesium solutions are usually basic in nature and can be neutralized, which may be an advantage in preventing acid leaching of certain minerals.

The specific gravity of the cesium solutions can easily be adjusted down by dilution with water. The solution can be reconcentrated safely by evaporation. A solution driven past the point of cesium tungstate or formate solubility can easily be restored by water addition. Sodium polytungstate (metatungstate)are often difficult to bring back into solution if driven to dryness, whereas, cesium tungstate remains readily soluble.

In a preferred embodiment, the subject invention provides a process for separating minerals from a mixture of minerals having different densities. The process comprises comminuting a mixture of minerals to liberate minerals and slurrying the minerals with an aqueous solution comprising a cesium and/or rubidium salt of an organic acid or of an inorganic acid. As used herein, reference to comminuting includes any means for liberating minerals including fracturing, pounding, breaking, pulverizing, or otherwise creating a fine powder. The concentration of the cesium salt in the aqueous solution meets at least one of the following criteria:

a) the solution has a density between the densities of the minerals being separated so that minerals having a density greater than the solution sink and minerals having a density less than the solution float; and separately recovering minerals which float and which sink.

b) the solution has a density and viscosity whereby, while all or almost all of the minerals sink, the heaviest minerals are retarded least so that the different minerals may be removed at varying times;

c) the solution has a density with the addition of a minimal amount of appropriately sized heavy media solids so that the resulting heavy media slurry is between the densities of the minerals being separated so that minerals having a density greater than said solution will sink and minerals having a density less than said solution will float; and separately recovering minerals which float and which sink;

where the sinking of the minerals can be caused simply by the force of gravity of the earth or by multiples of earth's gravity by the application of centrifigation.

Utilizing the materials and methods of the subject invention, minerals can be separated by specific gravity, retaining those minerals that are of interest, while rejecting many of the gangue mineral particles. Gravity concentration or flotation concentrates may be further cleaned of gangue minerals by heavy liquid separations using aqueous solutions of cesium salts. For example, the specific gravity of gold is over 19, whereas the specific gravity of quartz is 2.65. A solution of cesium tungstate will readily clean a gravity concentrate to produce a gold-rich concentrate as a sink product.

In a further embodiment of the subject invention, liquids such as aqueous solutions of cesium salts, can be used to separate gems from matrix materials. Diamonds have a specific gravity of 3.51, whereas quartz has a specific gravity of 2.65 and graphite a specific gravity of 2.22. Ruby has a specific gravity of 3.99, whereas quartz has a specific gravity of 2.65. Usually, separations of particles of the same size range can be achieved whenever a 0.1 difference exists in specific gravities. The cesium salts of the subject invention provide the ability to separate fine particles, 75 micron or less, not currently practicable due to the viscosity of current heavy media solutions. The low viscosity also allows the separation of specific gravities different down to only 0.01 units.

Materials which can be separated according to the subject invention include apatite. In general, gemstones and semi-precious or precious metals can be separated.

The process of the subject invention can be used on massive sulfides which are complex mixtures of copper, lead, iron, and other metals in ores that contain very fine mineral particles disseminated throughout the ore body. Massive sulfide ore bodies are becoming more important as the current simple ores are depleted.

There are currently a number of commercial coal-cleaning plants using suspension type heavy media. Because of their low viscosities, the cesium salts of the subject invention can be used in these processes.

In a specific embodiment the initial mixture of minerals which can be processed according to the subject invention is heavy mineral sand.

A heavy media plant including screens, but no crushing plant, could be installed to treat 18,000 metric tons per day for approximately 7 million dollars. The operating costs for such a plant would be estimated at 1.5 U.S. dollars per metric ton of feed. Such a plant would normally treat crushed ore that is sized minus 12,500 micron (½ inch) and plus 600 micron (28 mesh). The concentrator would then treat only 9,000 tons or less of a very clean, high-grade ore.

Following are examples that illustrate procedures for practicing the invention. These examples should not be construed as limiting. All percentages are by weight and all solvent mixture proportions are by volume unless otherwise noted.

EXAMPLE 1

A test of the pre-concentration of a lead ore was conducted using the heavy media of the subject invention. The test utilized a 2-kilogram charge of minus 1.7 mm (10 mesh) ore. This sample was screened to remove the minus 150 micron (100 mesh) fine material. The non-toxic heavy liquids of the subject invention permit the separation of particles that are greater than 150 microns and smaller than 1,700 micron (10 mesh). The specific gravities of the two liquids are: for Liquid No1 (cesium formate), 2.33775 and Liquid No 2 (cesium tungstate) 3.0133.

Liquid No 1 was used specifically to determine if the lead ore contained very light material such as graphite. Liquid No 2 was used to remove barren, and hard siliceous minerals such as quartz, mica, chert, and shale from the softer, more valuable sulfide minerals.

Heavy media pre-concentration is most readily adapted to ore from vein mines. The dilution by barren host rock can be removed in a heavy media circuit. Slurries of finely ground magnetite or ferrosilicon are used commercially to achieve the separations.

The data from the test are summarized in Table 2. The data indicates that 56% of the original weight could be discarded while retaining over 90% of the valuable minerals in the conventional froth flotation mill feed fraction. Only 31.5% of the total ore would require grinding before flotation, since 11.9% of the original ore was minus 150 micron (100 mesh) and could be sent directly to flotation.

TABLE 2

Percent distribution of pre-concentration final products

|  | Wt. | Ag | Pb | Zn | Fe | As |
| --- | --- | --- | --- | --- | --- | --- |
| Discard Material | 56.60 | 2.14 | 6.22 | 9.73 | 29.22 | 31.27 |
| Combined Mill Feed | 43.40 | 97.82 | 93.72 | 90.28 | 70.78 | 68.73 |

A very large fraction of this ore, 96% of the discard material or 54% of the original material, has a specific gravity greater than 2.3775, but less than 3.0133. Silver was not detected in this fraction, and the material assays of 0.08% Pb and 0.32% Zn indicate that this fraction can be considered barren waste not fit for grinding. These data also indicate a very significant liberation of gangue materials from ore minerals at a particle size that would be extremely coarse for flotation feed.

EXAMPLE 2

In this example a gravity concentrate containing 8,734 grams per metric ton (g/t) Au (254.73 troy ounces per short ton) and 2,431.2 g/t Ag (70.91 troy ounces per short ton) was further concentrated by a cesium formate solution. 400 milliliters (ml) of cesium formate solution with a 2.412 specific gravity was added to a 2.54 centimeter diameter dispensing burette. A further 100 ml of cesium formate solution was used to slurry 21.3 grams of the gravity concentrate. The slurry was added to the top of the column. A further 10 ml of cesium formate solution was used to wash out the beaker. Stop watch was started. The solids sank through the heavy media at observably different rates. Samples of the solution were withdrawn after 1, 2, 4, 6, and 8 minutes from the start of the experiment. After the final withdrawal, a dark solid layer was observable in the bottom of the burette. Solids were also observed suspended in the heavy media liquid. The total contents of the burette were considered tail after the eighth minute. The various slurry solutions were filtered. The solids were then washed with distilled water, dried, weighed, and assayed for gold and silver. The weights and assays of the various solids are shown in Table 3 along with the gold and silver distribution. The first concentrate showed over a 5-fold concentration of the gold and silver. A person skilled in the art with the teaching of this patent could devise means to increase the concentration ratio and recover over 99% of the total gold and silver. The usual ferro-silicon suspension heavy media would have great difficulty separating the fine gold, as the suspension of the media would cause resistance to the settling of the fines. The viscosity of a sodium polytungstate solution with a specific gravity of around 2.4 would be 10 times the cesium formate viscosity. This viscosity would hinder settling of the fine gold.

TABLE 3

Gold Bearing Gravity Concentrate Cesium Tungstate Upgrading Results

| Sample | g Solid | Assay, g/t Au | Assay, g/t Ag | Au Distribution Fraction | Au Distribution Cum. | Ag Distribution Fraction | Ag Distribution Cum. | Cumulative Grade Au | Cumulative Grade Ag |
|---|---|---|---|---|---|---|---|---|---|
| Con 1 | 2.3 | 39,110.4 | 11,948.2 | 53.6% | 53.6% | 52.8% | 52.8% | 39,110.4 | 11,948.2 |
| Con 2 | 4.1 | 10,570.7 | 3,294.1 | 25.8% | 79.5% | 26.0% | 78.8% | 20,827.2 | 6,404.2 |
| Con 3 | 4.8 | 4,880.2 | 1,611.8 | 14.0% | 93.5% | 14.9% | 93.6% | 13,992.8 | 4,350.3 |
| Con 4 | 5.3 | 1,043.7 | 300.0 | 3.3% | 96.8% | 3.1% | 96.7% | 9,833.4 | 3,049.3 |
| Con 5 | 4.2 | 664.5 | 191.1 | 1.7% | 98.4% | 1.5% | 98.2% | 7,973.0 | 2,469.4 |
| Tail | 7.1 | 373.0 | 128.6 | 1.6% | 100.0% | 1.8% | 100.0% | 6,032.0 | 1,871.6 |

It should be understood that the examples and embodiments described herein are for illustrative purposes only and that various modifications or changes in light thereof will be suggested to persons skilled in the art and are to be included within the spirit and purview of this application and the scope of the appended claims.

What is claimed is:

1. A process for separating minerals from a mixture of minerals having different densities wherein said process comprises comminuting said mixture of minerals to liberate minerals; slurrying said minerals with an aqueous solution comprising a cesium or rubidium salt of an organic acid or an inorganic acid, wherein the concentration of said salt in said aqueous solution meets at least one of the following criteria:

a) the solution has a density between the densities of the minerals being separated so that minerals having a density greater than said solution will sink and minerals having a density less than said solution will float such that said minerals of different densities can be separately recovered;

b) the solution has a density and viscosity whereby, while all or substantially all of the minerals sink, the heaviest minerals are retarded least so that the different minerals may be removed at varying times;

c) the solution has a density with the addition of a minimal amount of appropriately sized heavy media solids so that the resulting heavy media slurry is between the densities of the minerals being separated so that minerals having a density greater than said solution will sink and minerals having a density less than said solution will float; and separately recovering minerals which float and which sink;

where sinking of the minerals in said aqueous solution can be caused simply by the force of gravity of the earth or by multiples of the earth's gravity by the application of centrifugation.

2. The process, according to claim 1, wherein one of the minerals to be separated is coal.

3. The process, according to claim 2, wherein said coal is separated from associated rock minerals.

4. The process, according to claim 1, wherein one of the minerals to be separated is a gemstone or a semiprecious mineral.

5. The process, according to claim 1, wherein one of the minerals to be separated is apatite.

6. The process, according to claim 1, wherein the mixture of minerals is heavy mineral sand.

7. The process, according to claim 1, where a mineral to be recovered contains one or more of the following: gold, silver, platinum group metals, copper, lead, nickel, zinc, or cobalt.

8. The process, according to claim 1, wherein said cesium salt is selected from the group consisting of cesium formate, cesium tungstate, cesium molybdate, and cesium uranate.

9. The process, according to claim 1, wherein the cesium or rubidium salt is of the group of anions of rhenium, molybdenum, and manganese oxyacids.

10. The process, according to claim 1, wherein the heavy media solid in option c that is added to the salt is from the group ferrosilicon or tungsten carbide.

11. The process, according to claim 1, wherein said salt is a cesium salt.

12. The process, according to claim 1, wherein said salt is of an organic acid.

* * * * *